United States Patent
Yamamoto

(12) 
(10) Patent No.: US 6,256,452 B1
(45) Date of Patent: *Jul. 3, 2001

(54) STORAGE DEVICE FOR AN ELECTRONIC CAMERA THAT IS ACCESSIBLE BY AN EXTERNAL DEVICE

(75) Inventor: Yasuhiro Yamamoto, Tokyo (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,880

(22) Filed: Feb. 19, 1997

Related U.S. Application Data

(63) Continuation of application No. 08/525,137, filed on Sep. 8, 1995, now abandoned.

(30) Foreign Application Priority Data

Sep. 8, 1994 (JP) .................................................. 6-240522

(51) Int. Cl.$^7$ .................................................. H04N 5/225
(52) U.S. Cl. ........................................... 386/117; 348/372
(58) Field of Search ..................... 386/1, 46, 38, 386/117, 120; 358/906, 909.1; 348/207, 232, 372; H04N 5/225

(56) References Cited

U.S. PATENT DOCUMENTS

| | | | |
|---|---|---|---|
| 4,717,968 | * 1/1988 | Painton et al. | 358/310 |
| 4,802,020 | * 1/1989 | Miyake et al. | 358/342 |
| 4,989,078 | * 1/1991 | Paxton | 358/342 |
| 5,047,869 | * 9/1991 | Aoki et al. | 358/341 |
| 5,138,459 | * 8/1992 | Roberts et al. | 348/232 |
| 5,218,451 | * 6/1993 | Kodama et al. | 358/335 |
| 5,218,452 | * 6/1993 | Kondo et al. | 358/342 |
| 5,276,563 | * 1/1994 | Ogawa | 360/35.1 |
| 5,294,990 | * 3/1994 | Aoki | 348/363 |
| 5,359,427 | 10/1994 | Sato | 358/335 |
| 5,459,520 | * 10/1995 | Sasaki | 348/445 |
| 5,499,105 | * 3/1996 | Wakui | 358/342 |

FOREIGN PATENT DOCUMENTS 690423  3/1994  (JP) .

* cited by examiner

Primary Examiner—Young Lee
(74) Attorney, Agent, or Firm—Greenblum & Bernstein, P.L.C.

(57) ABSTRACT

An electronic still camera has a hard disk device in which a hard disk is mounted to record image data obtained by the electronic still camera. The hard disk can also be used as an external storage device for a computer. When a mode select switch is set to select a photographing mode to record image data on the hard disk, a rotation of the hard disk is stopped after recording the image data. When the mode select switch is set to select an external mode in which the hard disk is accessed by the computer, a rotation of the hard disk is stopped when the hard disk has not been accessed by the computer for, for example, 5 minutes.

20 Claims, 4 Drawing Sheets

STORAGE DEVICE FOR AN ELECTRONIC CAMERA THAT IS ACCESSIBLE BY AN EXTERNAL DEVICE

This application is a continuation of application Ser. No. 08/525,137, filed Sep. 8, 1995, now abandoned.

BACKGROUND OF THE INVENTION

1. Field of the Invention

The present invention relates to an electronic still camera in which a recording medium having a large storage capacity, such as a hard disk, for example, is mounted.

2. Description of the Related Art

Conventionally, there is known an electronic still camera which uses a hard disk as a recording medium and image data can be recorded in the form of digital signals (Japanese Unexamined Patent Publication No. 6-90423). The storage capacity of a hard disk is considerably larger than that of a recording medium such as a floppy disk, and therefore a hard disk can store a larger amount of image data than a floppy disk.

The hard disk mounted in the conventional electronic still camera is used only for storing image data obtained by photography and information relating to the photography. Namely, the hard disk cannot be used for any other purpose when the electronic still camera is not in use, and thus the utility value of the hard disk is not so high.

SUMMARY OF THE INVENTION

Therefore, an object of the present invention is to provide an electronic still camera which can be used not only for recording image data but also as an external storage device for a computer.

According to the present invention, there is provided an electronic still camera comprising a recording medium, a mode select switch, first control means and second control means.

Reading and writing operations are carried out for a recording medium, while the recording medium is rotated, the recording medium being connected to an external computer. The mode select switch is provided for selecting one of a photographing mode, in which image data is recorded on the recording medium, or an external mode, in which the recording medium is operated as an external storage of the external computer. The first control means is provided for controlling the recording medium in such a manner that, in the photographing mode, a rotation of the recording medium is stopped after recording the image data on the recording medium. The second control means is provided for controlling the recording medium in such a manner that, in the external mode, a rotation of the recording medium is stopped when the recording medium has not been accessed by the external computer for a predetermined time.

Further, according to the present invention, there is provided an electronic still camera using a recording medium for recording image data, the electronic still camera comprising connecting means, a mode select switch, first control means and second control means.

The connecting means connects the recording medium to an external computer so that the external computer can access the recording medium. The mode select switch selects one of a photographing mode, in which image data obtained by the electronic still camera is recorded on the recording medium, or an external mode, in which the recording medium is accessed by the external computer. The first control means controls the recording medium in such a manner that, in the photographing mode, a rotation of the recording medium is stopped after recording the image data on the recording medium. The second control means controls the recording medium in such a manner that, in the external mode, a rotation of the recording medium is stopped when the recording medium has not been accessed by the external computer for a predetermined time.

Furthermore, according to the present invention, there is provided an electronic still camera using a recording medium for recording image data, the electronic still camera comprising connecting means, setting means and a mode select switch.

The connecting means connects the recording medium to an external computer so that the external computer can access the recording medium. The setting means sets a photographing mode so that image data obtained by the electronic still camera is recorded on the recording medium. The setting means sets an external mode so that the recording medium is accessed by the external computer. The mode select switch actuates one of the photographing mode setting means or the external mode setting means. The rotation of the recording medium is stopped after recording the image data on the recording medium in the photographing mode, and is stopped when the recording medium has not been accessed by the external computer for a predetermined time in the external mode.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
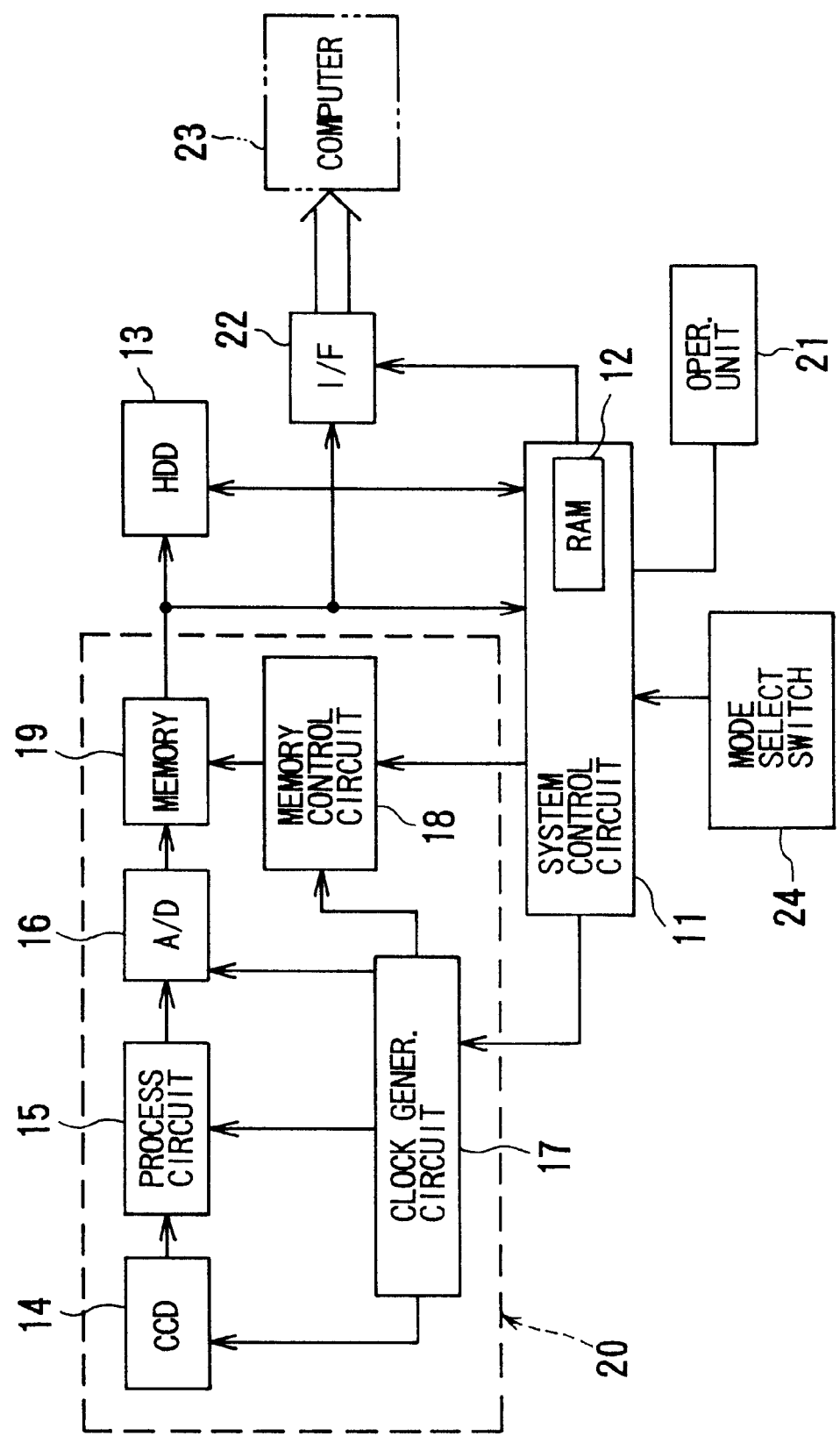
FIG. 1 is a block diagram showing a general construction of an electronic still camera of an embodiment according to the present invention.

FIG. 1 is a block diagram showing the general construction of an electronic still camera of an embodiment according to the present invention.

A system control circuit 11 comprises a microcomputer which controls the entire electronic still camera, and a memory (RAM) 12. In accordance with the control of the system control circuit 11, digital image data is recorded on a hard disk mounted in a hard disk device (HOD) 13. The hard disk device 13 can be connected to an external computer (not shown) through an interface 22. Note that a hard disk mounted in the hard disk device 13 should have been beforehand formatted according to the format corresponding to the operating system of the external computer so that the hard disk can be accessed in accordance with the operating system of the computer, and the image data is recorded on the hard disk with the format which the computer can handle so that a compatibility is established between the computer and the camera.

A light beam passing through an optical system (not shown) is incident onto a light receiving surface of a solid state imaging device (CCD) 14, so that an image signal corresponding to an object image is generated in the CCD 14. The image signal is subjected to a process, such as a gamma correction, in a process circuit 15, and is converted into a digital signal in an A/D converter 16. The CCD 14, the process circuit 15 and the A/D converter 16 are operated in accordance with a clock signal outputted from a clock generating circuit 17, which generates a clock signal based on the control of the system control circuit 11.

The digital image data is stored in a memory 19 based on the control of a memory control circuit 18, which is operated in accordance with the clock signal generated by the clock generating circuit 17 and performs address control for the memory 19 based on a command signal outputted from the system control circuit 11.

Namely, an imaging unit 20 includes the CCD 14, the process circuit 15, the A/D converter 16, the clock generating circuit 17, the memory control circuit 18 and the memory 19. In the imaging unit 20, the object image is converted into an electronic signal and a predetermined process is applied to the electronic signal.

An operation unit 21 and a mode select switch 24 are connected to the system control circuit 11. The operation unit 21 has a power switch, a shutter release switch, an operation switch for the hard disk and other switches. Control of a photographing operation, and an operation of recording image data onto the hard disk, is carried out in accordance with operation of the operation unit 21. When the mode select switch 24 is set to an ON-state, the imaging unit 20 is set to an operating condition and a photographing mode in which image data is recorded on the hard disk. When the mode select switch 24 is set to an OFF-condition, the imaging unit 20 is set to a halt condition and an external mode in which the hard disk of this electronic still camera can be operated as an external storage device of the external computer 23.

Figure 2:
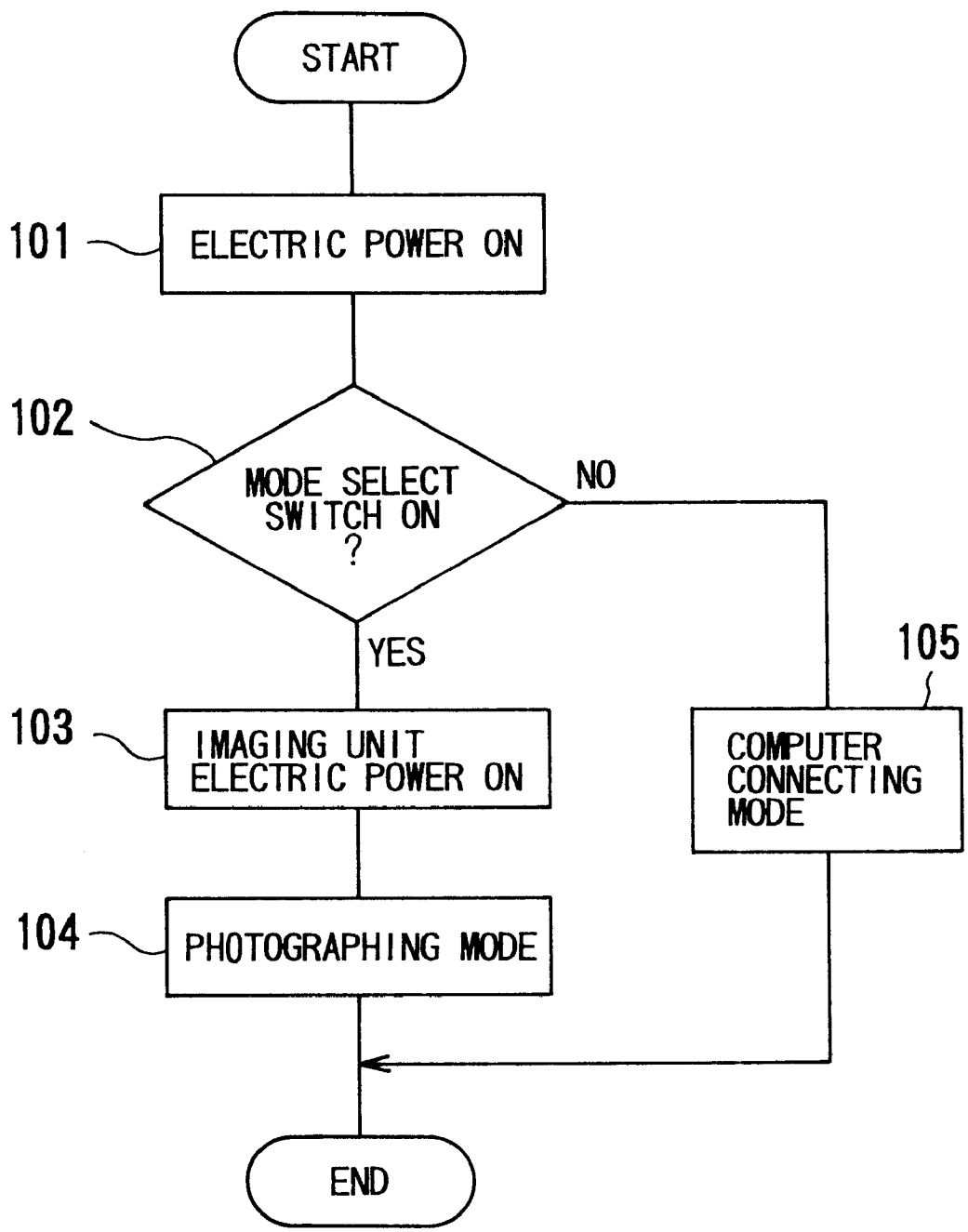
FIG. 2 is a flowchart showing a program for setting an operation mode of the electronic still camera.

FIG. 2 is a flowchart showing a program for setting an operation mode of the electronic still camera. This program is executed by the system control circuit 11, and is started by operating a main switch provided in the operation unit 21.

In Step 101, electric power is supplied to all portions except the imaging unit 20. In Step 102, it is determined whether the mode select switch 24 is turned ON. When the mode select switch 24 is in the ON-condition, electric power is supplied to the imaging unit 20 in Step 103, and then, the photographing mode is set in Step 104 so that image data can be recorded on the hard disk. Conversely, if it is determined in Step 102 that the mode select switch 24 is set to the OFF-condition, a computer connecting mode is set in Step 105 so that the electronic still camera can be used as an external storage device for the computer 23. In this computer connecting mode, no electric power is supplied to the imaging unit 20 from the system control circuit 11.

Figure 3:
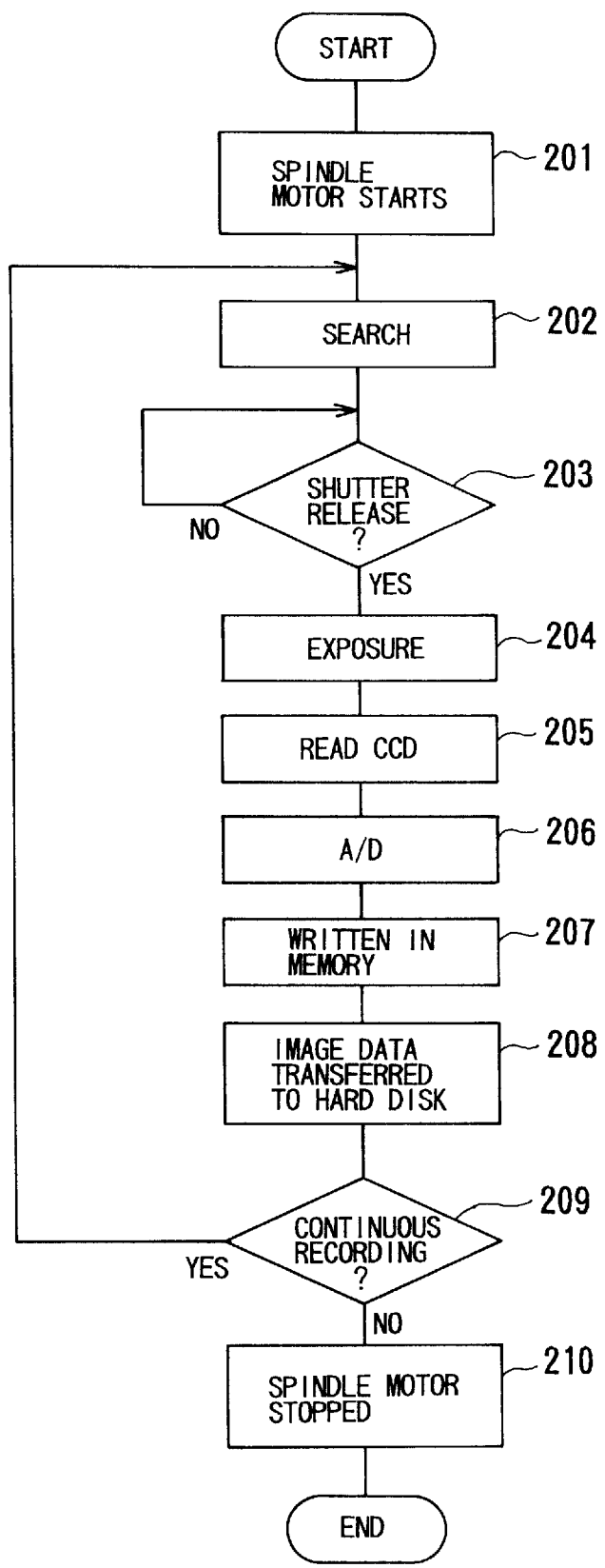
FIG. 3 is a flowchart showing a program for writing image data on a hard disk.

FIG. 3 is a flowchart showing a program for writing image data to the hard disk. This program is executed in the photographing mode set in Step 104 of FIG. 2.

In Step 201, a spindle motor mounted on the hard disk device 13 is started, and operates at a predetermined speed. In Step 202, a FAT-table of the hard disk is referred to, so that a file area of the hard disk in which image data can be stored is searched.

In Step 203, it is determined whether a shutter release has been carried out. When the shutter release has been carried out, the CCD 14 is exposed for a predetermined period in Step 204. In Step 205, the image signal is read out from the CCD 14. The image signal is converted into a digital signal in Step 206, and is written in the memory 19 in Step 207. In Step 208, the image data is read out from the memory 19, and the image data is transferred to the hard disk and written on a predetermined area of the hard disk.

In Step 209, it is determined whether a continuous recording mode has been set. When the continuous recording mode has been set, Steps 202 through 208 are again executed. When the continuous recording mode has not been set, the spindle motor is stopped in Step 210, and this routine is ended.

Thus, writing and reading operations are carried out while the hard disk is rotated, and in the photographing mode, the rotation of the hard disk is stopped after image data is recorded on the hard disk.

On the other hand, in the computer connecting mode set in Step 105 of FIG. 2, i.e., when the hard disk is operated as an external storage device for the computer 23, the rotation of the hard disk is started in accordance with command signals such as a reading command, a writing command and a seek command outputted by the computer 23. If the electric power of the computer 23 is turned OFF for some reason while the hard disk is accessed based on control of the computer 23, an fact that the error has occurred in the computer 23 is detected by the system control circuit 11 based on a signal inputted through the interface 22. As a result, the spindle motor of the hard disk device 13 is stopped based on a control of the system control circuit 11. Namely, since the spindle motor can be controlled, no trouble occurs.

Conversely, during a bus free phase in which the hard disk is not accessed by the computer 23, if the electric power of the computer 23 is turned OFF, the error occurring in the computer 23 cannot be detected based on a signal inputted through the interface 22, since no signal is inputted through the interface 22. Thus, the rotation of the hard disk cannot be stopped by the system control circuit 11.

Therefore, in the embodiment, as described below, when the hard disk has not been accessed by the computer 23 for a predetermined time, the rotation of the spindle motor is stopped.

Figure 4:
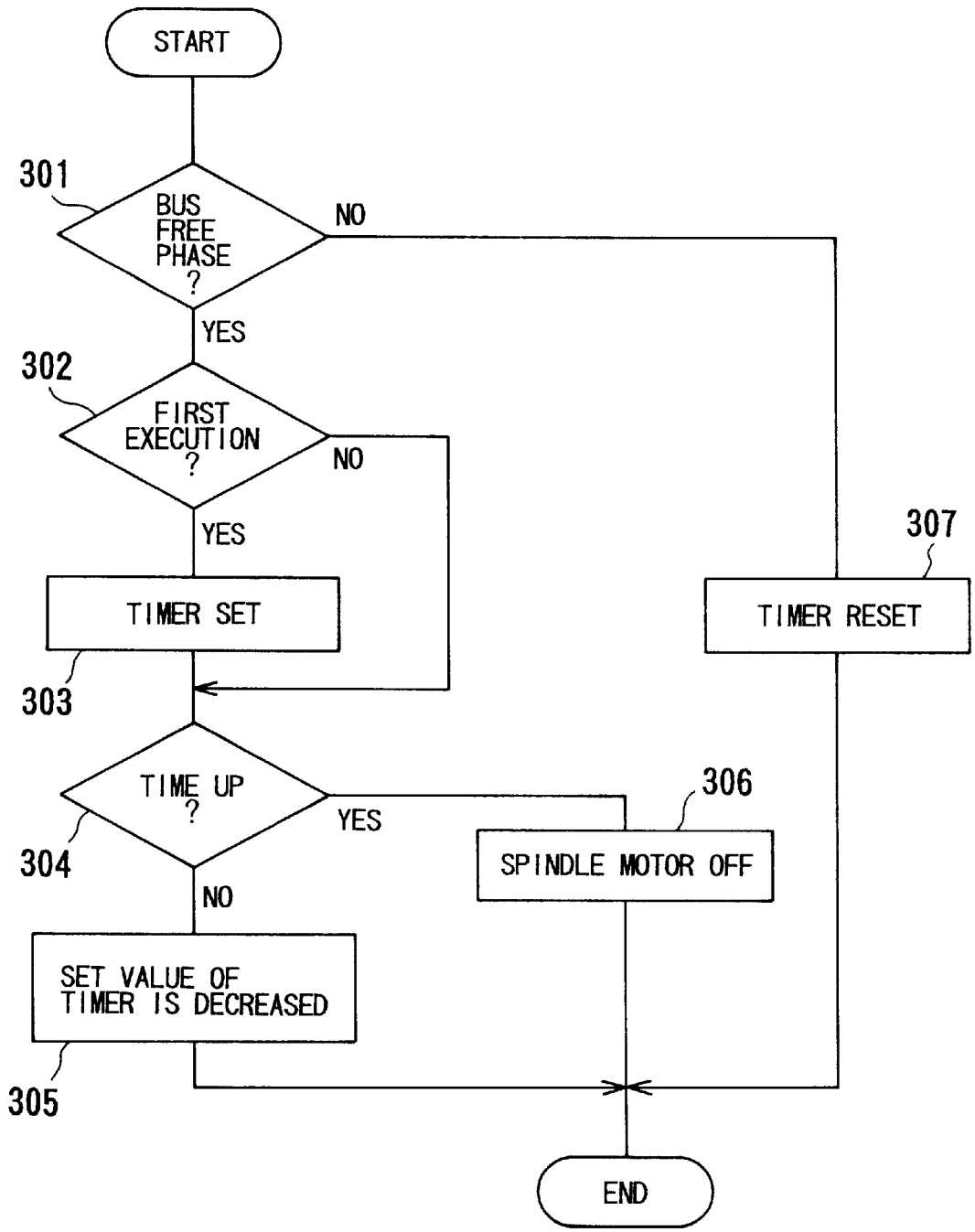
FIG. 4 is a flowchart showing a program for controlling a spindle motor while the hard disk is not accessed by a computer.

FIG. 4 is a flowchart showing a program for controlling the spindle motor while the hard disk is not accessed by the computer 23. This program is executed by the system control circuit 11, and is executed periodically at a constant time interval by an interrupt handling routine while the electric power of the electronic still camera is turned ON.

In Step 301, it is determined whether the bus free phase has been set. When the bus free phase has been set, Step 302 is executed. To the contrary, when the bus free phase has not been set, a timer is reset in Step 307, and this routine is ended. In Step 302, it is determined whether this routine is being executed for the first time, i.e., whether it is immediately after the timer was set in Step 303. When this routine is executed for the first time, the timer is set to 5 minutes, for example, in Step 303, and then, the process goes to Step 304. Conversely, when Step 303 was executed so that the timer has been operated, Step 303 is skipped so that Step 304 is executed.

In Step 304, it is determined whether 5 minutes has passed since the timer was set in Step 303. If 5 minutes has not passed, the set value of the timer is decreased by a constant value in Step 305, and this routine is ended. Conversely, when it is determined in Step 304 that 5 minutes has passed, the spindle motor is stopped in Step 306, and this routine is ended.

Namely, due to the control shown in FIG. 4, the rotation of the hard disk is continued for at least 5 minutes after reading and writing operations to and from the hard disk by the computer 23 are completed, and then, is stopped. In other words, if the hard disk is accessed by the computer 23 even once within any 5 minute period, the rotation of the hard disk is continued.

As described above, according to the embodiment, the hard disk provided in the electronic still camera can be used not only for recording image data obtained by a photographing operation, but also for an external storage device of the computer 23, and therefore the utility value of the hard disk is improved.

Note that, although the hard disk is used as a recording medium in the above embodiment, the present invention can be applied to an electronic still camera using a magneto-optical disc.

Further, note that the set value of the timer provided in the routine shown in FIG. 4 is not restricted to 5 minutes. Namely, the set value can be set in accordance with any purpose, and preferably set to 5 through 10 minutes, for example.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI 6-240522 (filed on Sep. 8, 1994) which is expressly incorporated herein, by reference, in its entirety.

What is claimed is:

1. An electronic still camera, comprising:
    a recording medium for which reading and writing operations are carried out while said recording medium is rotated, said recording medium being electrically connectable to an external computer not associated with said electronic still camera in order to perform operations unrelated to said electronic still camera;
    a mode select switch that selects one of a photographing mode, in which image data obtained from said electronic still camera is recorded on said recording medium, and an external mode, in which data distinct from said image data obtained from said electronic still camera is recorded on said recording medium under control of the external computer;
    a first control system that controls said recording medium, in said photographing mode, such that a rotation of said recording medium is stopped after recording said image data on said recording medium;
    a second control system that controls said recording medium, in said external mode, in accordance with a control signal output from the external computer to record data output from the external computer on the recording medium; and
    an imaging unit that converts an object image into an electronic signal and applies a predetermined process to the electronic signal, electrical power being supplied to said imaging unit upon a determination that said photographic mode is selected by said mode select switch.

2. An electronic still camera according to claim 1, wherein said recording medium comprises a hard disk.

3. An electronic still camera according to claim 1, wherein said recording medium comprises a magneto-optical disc.

4. An electronic still camera according to claim 1, wherein said second control system controls said recording medium in such a manner that, in said external mode, rotation of said recording medium is continued for at least a predetermined time period after completing at least one of a writing operation and a reading operation of said recording medium by the external computer.

5. An electronic still camera according to claim 1, said second control system supplying no electric power to said imaging unit.

6. An electronic still camera according to claim 1, wherein said rotation of said recording medium is started in accordance with a command signal outputted by the external computer.

7. The electronic still camera of claim 1, wherein said second control system stops a rotation of said recording medium when said recording medium has not been accessed by the external computer for a predetermined period of time.

8. An electronic camera using a recording medium for recording image data, said electronic camera comprising:
    a system that electrically connects said recording medium to an external computer so that the external computer can access said recording medium for operations unrelated to said electronic camera;
    a mode select switch that selects one of a photographing mode, in which image data obtained by said electronic camera is recorded on said recording medium, and an external mode, in which data distinct from said image data obtained by said electronic camera is recorded to said recording medium under control of the external computer;
    a first control system that controls said recording medium, in said photographing mode, such that a rotation of said recording medium is stopped after recording said image data on said recording medium;
    a second control system that controls said recording medium, in said external mode, in accordance with a control signal output from the external computer to record data output from the external computer on the recording medium; and
    an imaging unit that converts an object image into an electronic signal and applies a predetermined process to the electronic signal, electrical power being supplied to said imaging unit upon a determination that said photographic mode is selected by said mode select switch.

9. The electronic camera of claim 8, wherein said electronic camera comprises an electronic still camera.

10. The electronic camera of claim 8, wherein said second control system stops a rotation of said recording medium when said recording medium has not been accessed by the external computer for a predetermined period of time.

11. An electronic camera using a recording medium for recording image data, comprising:
    a connecting unit that electrically connects said recording medium to an external computer, so that the external computer can access said recording medium for operations unrelated to said electronic camera;
    a system that sets a photographing mode, so that image data obtained by said electronic camera is recorded on said recording medium;
    a system that sets an external mode, so that data distinct from said image data obtained by said electronic camera is recorded to said recording medium under control of the external computer;
    a mode select switch for actuating one of said photographing mode setting system and said external mode setting system, a rotation of said recording medium being stopped after recording said image data on said recording medium when said mode select switch actuates said photographing mode, a control signal output from the external computer controlling the record medium to record data output from the external computer when said mode select switch actuates said external mode setting system; and an imaging unit that converts an object image into an electronic signal and applies a predetermined process to the electronic signal, electrical power being supplied to said imaging unit upon a determination that said photographic mode has been actuated by said mode select switch.

12. The electronic camera of claim 11, wherein said electronic camera comprises an electronic still camera.

13. The electronic camera of claim 11, wherein a rotation of said recording medium is stopped when said recording medium has not been accessed by the external computer for a predetermined period of time when said mode select switch actuates said external mode setting system.

14. An electronic camera, comprising:

a main switch that controls a supply of electrical power to said electronic camera;

a storage device;

a first interface that connects said imaging unit to said storage device;

a second interface that electrically connects said storage device to an external computer so that the external computer can access said storage device for operations unrelated to said electronic camera;

a selecting unit that selects one of a photographing mode and an external operation mode, image data obtained by said electronic camera being stored to said storage device when said photographing mode is selected, data associated with and output from the external computer being stored to said storage device by a control signal output from the external computer when said external operation mode is selected; and an imaging unit that converts an object image into an electronic signal and applies a predetermined process to the electronic signal, electrical power not being supplied to said imaging unit when said main switch is turned to an ON condition to supply electrical power to said electronic camera.

15. The electronic camera of claim 14, wherein said electronic camera comprises an electronic still camera.

16. The electronic camera of claim 14, further comprising a system controller that controls operations of said storage device.

17. The electronic camera of claim 16, wherein said system controller deactivates said storage device after image data is stored to said storage device, when said photographing mode is selected by said selecting unit.

18. The electronic camera of claim 17, wherein said system controller deactivates said storage device after an elapse of a predetermined period of time in which no storage device activity occurs, when said external operation mode is selected by said selecting device.

19. The electronic camera of claim 14, wherein electrical power to said imaging unit is disabled when said selecting device selects said external operation mode.

20. The electronic camera of claim 14, wherein said storage device comprises a hard disk drive.

* * * * *